(12) United States Patent
Hashimoto (10) Patent No.: US 9,893,415 B2
(45) Date of Patent: Feb. 13, 2018

(54) TWO-WHEELED MOTOR VEHICLE (71) Applicant: YAMAHA HATSUDOKI KABUSHIKI KAISHA, Shizuoka-ken (JP)

(72) Inventor: Yasushi Hashimoto, Shizuoka-Ken (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 0 days.

(21) Appl. No.: 14/772,756

(22) PCT Filed: Feb. 27, 2014

(86) PCT No.: PCT/JP2014/054955
§ 371 (c)(1),
(2) Date: Sep. 3, 2015

(87) PCT Pub. No.: WO2014/136658
PCT Pub. Date: Sep. 12, 2014

(65) Prior Publication Data
US 2016/0013545 A1 Jan. 14, 2016

(30) Foreign Application Priority Data
Mar. 7, 2013 (JP) ................................ 2013-045435

(51) Int. Cl.
*H01Q 1/32* (2006.01)
*H01Q 21/29* (2006.01)
(Continued)

(52) U.S. Cl.
CPC .............. *H01Q 1/325* (2013.01); *B62J 15/00* (2013.01); *B62J 99/00* (2013.01); *B62K 11/02* (2013.01);
(Continued)

(58) Field of Classification Search
CPC .... H01Q 1/325; H01Q 1/3275; H01Q 1/3283; H01Q 21/29; H01Q 1/32
See application file for complete search history.

(56) References Cited

U.S. PATENT DOCUMENTS 6,873,297 B1   3/2005   Posluszny
7,466,279 B2 * 12/2008  Kushida ............... H01Q 1/3233
                                                        343/713
(Continued)

FOREIGN PATENT DOCUMENTS

DE   10-2010-028-881 A1   12/2010
EP         1905682 A1      4/2008
(Continued)

OTHER PUBLICATIONS

Office Action received in corresponding European Patent Application No. 14760526.5 dated Jul. 26, 2016.
(Continued)

*Primary Examiner* — Hoang Nguyen
(74) *Attorney, Agent, or Firm* — Rabin & Berdo, P.C.

(57) ABSTRACT

Since a front antenna 33 performs road-to-vehicle communication and vehicle-to-vehicle communication with oncoming vehicles, a nondirectional antenna enables effective communication in communication distances. Vehicle-to-vehicle communication with rearward vehicles by a rear antenna 37 needs long communication distances compared with road-to-vehicle communication and vehicle-to-vehicle communication with oncoming vehicles. The rear antenna 37 can also perform communication effectively with rear vehicles since what is selected is a directional one that can provide longer communication distances than a nondirectional one and that has directionality rearward of the vehicle. The front antenna 33 is disposed forward of a seat 7, and the rear antenna 37 is disposed rearward of the seat 7, which can inhibit an attenuation of electromagnetic waves due to the rider and the like. Consequently, while being capable of
(Continued)

performing road-to-vehicle communication effectively, vehicle-to-vehicle communication with rearward vehicles can also be performed effectively.

17 Claims, 11 Drawing Sheets

(51) Int. Cl.
    *B62J 15/00*     (2006.01)
    *B62K 11/02*     (2006.01)
    *B62J 99/00*     (2009.01)

(52) U.S. Cl.
    CPC ......... *H01Q 1/3233* (2013.01); *H01Q 1/3275* (2013.01); *H01Q 1/3283* (2013.01); *H01Q 21/29* (2013.01); *B62J 2099/004* (2013.01); *B62K 2202/00* (2013.01)

(56) References Cited

U.S. PATENT DOCUMENTS

| | | |
|---|---|---|
| 2002/0003488 A1 | 1/2002 | Levin et al. |
| 2002/0003501 A1 | 1/2002 | Kushida et al. |

FOREIGN PATENT DOCUMENTS

| | | |
|---|---|---|
| JP | 2001-352209 A | 12/2001 |
| JP | 2005-108008 A | 4/2005 |
| JP | 2006-103379 A | 4/2006 |
| JP | 2006-225160 A | 8/2006 |
| JP | 2006-232181 A | 9/2006 |
| JP | 2008-080867 A | 4/2008 |
| JP | 2008-239069 A | 10/2008 |
| JP | 2010-116128 A | 5/2010 |
| JP | 2011-160339 A | 8/2011 |
| JP | 2011-225160 A | 11/2011 |
| JP | 2012-176754 A | 9/2012 |
| WO | WO-2012/029687 A1 | 3/2012 |

OTHER PUBLICATIONS

European Search Report received in the corresponding European Patent Application No. 14760526.5 dated Dec. 9, 2015.

\* cited by examiner

TWO-WHEELED MOTOR VEHICLE

TECHNICAL FIELD

This invention relates to two-wheeled motor vehicles for performing communications specified in ASV (Advanced Safety Vehicle) using IT (Information Technology), which is a part of the ITS (Intelligent Transport System), and more particularly relates to antenna arranging structures.

BACKGROUND ART

Conventionally, there exists a first apparatus that has an antenna disposed forward of a vehicle for performing communications with vehicles in front or with roadside units (see Patent Document 1, for example). Specifically, a nondirectional antenna is disposed forward of an inclined line extending between the middle of a bar handle and the axle of a front wheel. This prevents influences of wave absorption by the rider's body, and prevents lowering of electric field strength in up and down and right and left directions.

Further, there exists a second apparatus that has a base in a storage box at the rear, and has a nondirectional antenna removably attached to the base (see Patent Document 2, for example). The antenna in this second apparatus is for receiving radio, and not for performing communications for an advanced safety vehicle ASV. However, a construction is employed to dispose the nondirectional antenna in the rear storage box.

PRIOR ART DOCUMENTS

Patent Documents

[Patent Document 1]
Unexamined Patent Publication No. 2001-352209
[Patent Document 2]
Unexamined Patent Publication No. 2008-239069

SUMMARY OF INVENTION

Technical Problem

However, the conventional examples with such constructions have the following problems.

The first conventional apparatus is suitable for performing road-to-vehicle communication using spot communication (also called DSRC (Dedicated Short Range Communication)) with roadside units (also called ITS spots) installed at roadside, for example, for providing ITS spot service, in order to use an information providing service, charge settlement service and so on. On the other hand, there is a disadvantage where, of vehicle-to-vehicle communications which are communications between the rider's own vehicle and other vehicles, communication is made with another vehicle located rearward. This is because, although vehicle-to-vehicle communication with a rearward vehicle requires a longer communication distance than road-to-vehicle communication and vehicle-to-vehicle communication at a time of passing each other, a transmit-receive distance with a rearward vehicle becomes short under the influence of attenuation or reflection by the rider or the load located rearward of the antenna.

The second conventional apparatus is also applicable to vehicle-to-vehicle communication with other vehicles located rearward, but is disadvantageous for vehicle-to-vehicle communication with other vehicles located in front. This is because a transmit-receive distance with forward locations becomes short under the influence of attenuation or reflection by the rider or the load located forward of the antenna.

This invention has been made in view of the state of the art noted above, and its object is to provide two-wheeled motor vehicles which, while being capable of effectively performing road-to-vehicle communication and vehicle-to-vehicle communication with forward vehicles (preceding vehicles and oncoming vehicles), can also effectively perform vehicle-to-vehicle communication with rearward vehicles.

Solution to Problem

To fulfill the above object, this invention provides the following construction.

This invention provides a two-wheeled motor vehicle for performing road-to-vehicle communication with roadside units, and vehicle-to-vehicle communication with forward vehicles and rearward vehicles, comprising a front antenna disposed forward of a seat of the two-wheeled motor vehicle; and a rear antenna rearward disposed rearward of the seat of the two-wheeled motor vehicle; wherein the front antenna consists of a nondirectional antenna; and the rear antenna consists of a directional antenna having directionality rearward of a vehicle body.

Functions and Effects

According to the invention, the front antenna mainly performs road-to-vehicle communication with roadside units and vehicle-to-vehicle communication with preceding vehicles and oncoming vehicles at times of passing each other. It is therefore possible to perform communications effectively by employing a nondirectional antenna which has wide-angle transmit-receive characteristics. On the other hand, vehicle-to-vehicle communication with rearward vehicles by means of the rear antenna needs a long communication distance compared with the road-to-vehicle communication and vehicle-to-vehicle communication with oncoming vehicles at times of passing each other. In this invention, the rear antenna has directionality that enables a long communication distance compared with nondirectionality, and that is rearward of the vehicle. It is therefore possible to perform communications effectively with rearward vehicles also. Since the front antenna is disposed forward of the seat, and the rear antenna rearward of the seat, the electromagnetic waves can be inhibited from being attenuated by the bodies of the rider and passenger. The rear antenna having a rearward directionality can inhibit bad influences of an interference with the electromagnetic waves of the front antenna. As a result, the road-to-vehicle communication and the vehicle-to-vehicle communication with forward vehicles (preceding vehicles and oncoming vehicles) can be performed effectively, and at the same time the vehicle-to-vehicle communication with rearward vehicles can also be performed effectively.

In this invention, it is preferred that the rear antenna is attached below a taillight unit.

There are a grab bar and a load carrier above the taillight unit, and when a load is placed thereon, the rear antenna may be blocked by the load, which may exert a bad influence on the emission of electromagnetic waves. However, since the rear antenna is located below the taillight unit, the rear antenna is not blocked by the load, and no bad influence is exerted on the emission of electromagnetic waves. Therefore, communication is not obstructed by the influence of the load.

The taillight unit here includes one having only a taillight indicating a braking situation, and one having turn signals as well as the taillight in an integrated manner.

In this invention, it is preferred that the rear antenna is disposed inward of side covers covering areas around a lower part of the taillight unit.

Since the side covers are often formed of resin, by containing the rear antenna inward of the side covers, a fine appearance can be maintained without a bad influence on the emission of electromagnetic waves.

In this invention, it is preferred that the rear antenna is attached through an anchor to a lower surface of the taillight unit located inward of the side covers.

The rear antenna can be fixed stably since it is attached through the anchor to the lower surface of the taillight unit located inward of the side covers.

In this invention, it is preferred that the rear antenna is disposed outward of side covers covering areas around a lower part of the taillight unit.

The rear antenna, since it is disposed outward of the side covers, can assure a high degree of freedom of arrangement. Therefore, not only assuring a high degree of freedom of design for the two-wheeled motor vehicle, this allows the rear antenna to be installed afterward as an add-on.

In this invention, it is preferred that the rear antenna is attached to a rear slope of a rear fender through an anchor.

While being able to avoid interference with other components, a high degree of freedom can be afforded to an attaching method compared with a case of attachment to other portions.

In this invention, it is preferred that the rear fender has a reinforcing member attached along a front slope thereof for supporting the rear antenna.

The rear fender is often formed of resin, which makes it difficult to give strong support. So, by providing the reinforcing member along the front slope, the support for the rear antenna can be strengthened. Further, an outward appearance is not impaired since the reinforcing member is not exposed from the rear surface of the rear fender.

In this invention, it is preferred that the anchor is formed such that an angle between a base seating surface attached to the rear slope of the rear fender and an antenna seating surface to which the rear antenna is attached cause the rear antenna to be in an upright posture as seen from a side.

The angle between the base seating surface and antenna seating surface of the anchor is set to place the rear antenna in an upright posture. The rear antenna can therefore be attached in a posture well suited for vehicle-to-vehicle communication with rearward vehicles.

In this invention, it is preferred that the rear fender has, formed integrally with the rear slope, an attaching portion for attaching the rear antenna; and the rear antenna is attached to the attaching portion.

Since the rear fender and attaching portion are formed integrally, the rear antenna can be attached rigidly to the rear fender. Further, the number of parts for attachment can be reduced, thereby to keep the cost low.

In this invention, it is preferred that the rear antenna is attached above a license plate.

The license plate is prevented from exerting a bad influence on the emission of electromagnetic waves from the rear antenna.

In this invention, it is preferred that the license plate is attached by a license plate mounting bracket having, integrated together, a license plate attaching portion to which the license plate is attached, and a rear antenna attaching portion to which the rear antenna is attached.

The rear antenna can be attached easily since the license plate is attached to the license plate attaching portion of the license plate mounting bracket, and the rear antenna is attached to the rear antenna attaching portion. The rear antenna can therefore be attached efficiently.

In this invention, it is preferred that the license plate mounting bracket is formed such that an angle between the license plate attaching portion and the rear antenna attaching portion causes the rear antenna to be in an upright posture as seen from a side.

The angle between the license plate attaching portion and rear antenna attaching portion of the license plate mounting bracket is set to place the rear antenna in an upright posture. The rear antenna can therefore be attached in a posture well suited for vehicle-to-vehicle communication with rearward vehicles.

In this invention, it is preferred that the rear antenna is attached in a rearward region marked by a vertical line drawn from a rear end of a seat frame continuous with and rearward of a main frame and an extended line along a rear slope of a rear fender.

Stable communication can be performed since bad influences of other components can be prevented while preventing the bad influence of a load placed on the grab bar and the load carrier.

In this invention, it is preferred that the front antenna is attached through an anchor to a stay extending from a main frame further forward of a head tube for fixing a front cover.

The front antenna can be attached relatively easily by attaching the front antenna through the anchor to the stay which fixes the front cover.

In this invention, it is preferred that the front antenna is attached to a front fork through an anchor.

With the front antenna attached to the front fork through the anchor, the front antenna can be attached easily even to a two-wheeled motor vehicle without a front cover.

In this invention, it is preferred that the front antenna is attached forward of a headlight and below the headlight.

Lighting by the headlight is not obstructed, and besides a forward emission of electromagnetic waves from the front antenna is not obstructed by the headlight.

Advantageous Effects of Invention

With the two-wheeled motor vehicle according to the invention, the front antenna mainly performs road-to-vehicle communication with roadside units and vehicle-to-vehicle communication with preceding vehicles and oncoming vehicles at times of passing each other. It is therefore possible to perform communication effectively by employing a nondirectional antenna which has wide-angle transmit-receive characteristics. On the other hand, vehicle-to-vehicle communication with rearward vehicles by means of the rear antenna needs a long communication distance compared with the road-to-vehicle communication and vehicle-to-vehicle communication with oncoming vehicles at times of passing each other. In this invention, the rear antenna has directionality enabling a long communication distance compared with an antenna has nondirectionality, and has the directionality rearward of the vehicle. It is therefore possible to also perform communication effectively with rearward vehicles. Since the front antenna is disposed forward of the seat, and the rear antenna rearward of the seat, electromagnetic waves can be inhibited from being attenuated by the bodies of the rider and the passenger. The rear antenna having rearward directionality can inhibit bad influences by preventing interference with the electromagnetic waves of the front antenna. As a result, the road-to-vehicle communication and the vehicle-to-vehicle communication with forward vehicles (preceding vehicles and oncoming vehicles) can be performed effectively, and at the same time the vehicle-to-vehicle communication with rearward vehicles can also be performed effectively.

BRIEF DESCRIPTION OF DRAWINGS

FIG. 8 shows a license plate mounting bracket, in which (a) is a side view, and (b) is a front view.

DESCRIPTION OF EMBODIMENTS

Description will be made hereinafter with reference to embodiments concerning two types of two-wheeled motor vehicles for example.

Embodiment 1

Figure 1:
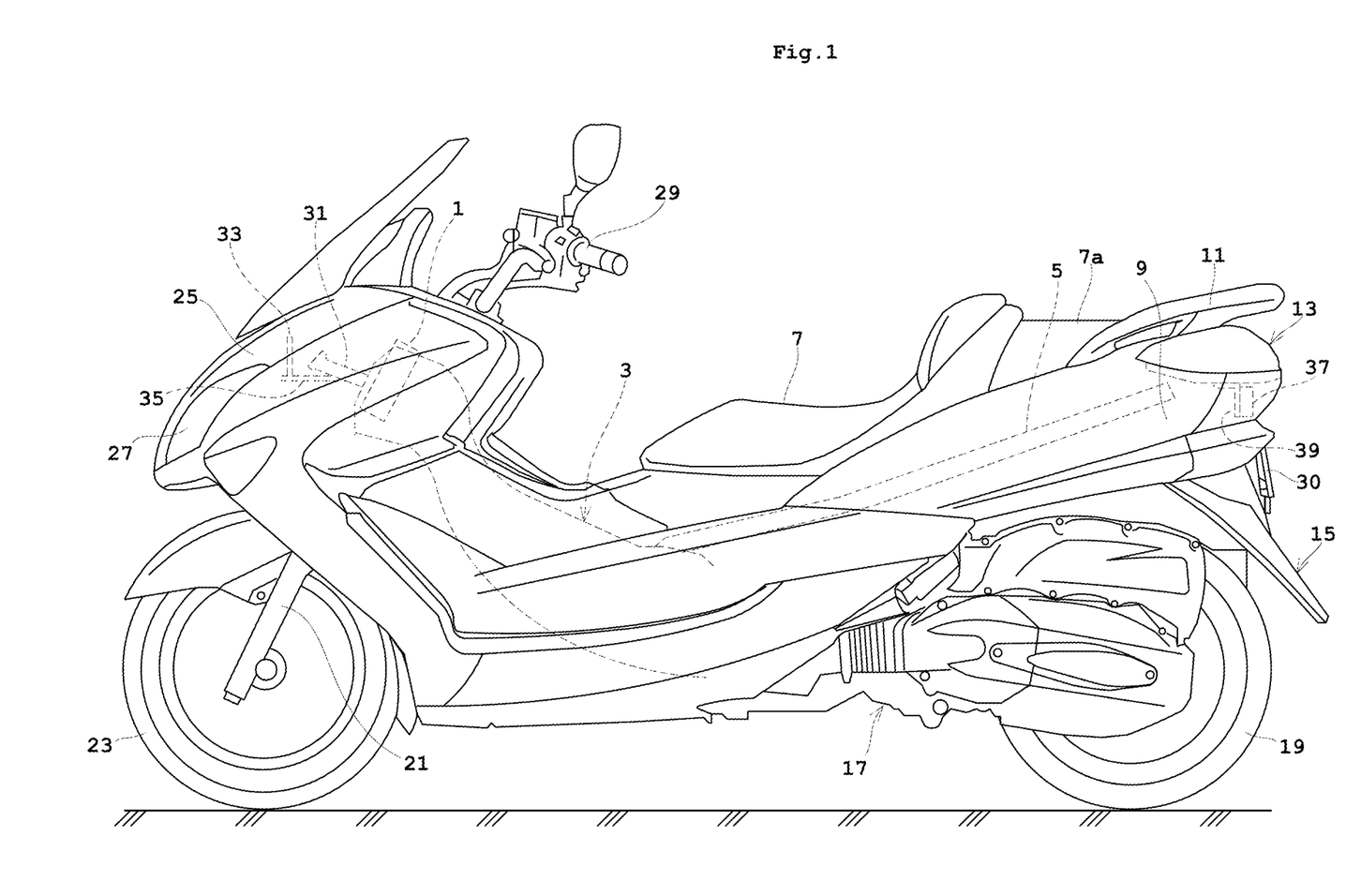
FIG. 1 is a side view of a scooter according to Embodiment 1.
Figure 2:
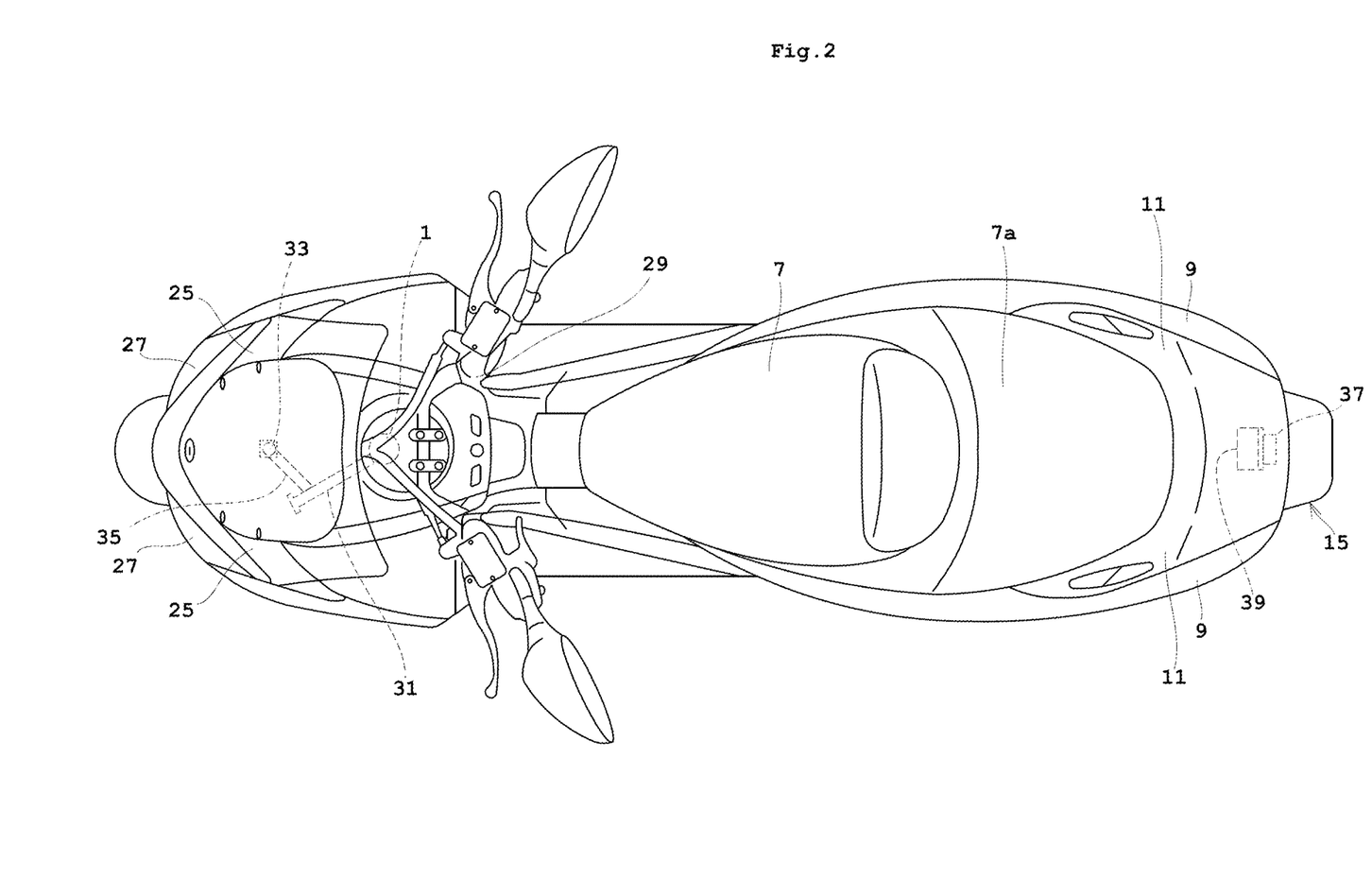
FIG. 2 is a plan view of the scooter according to Embodiment 1.
Figure 3:
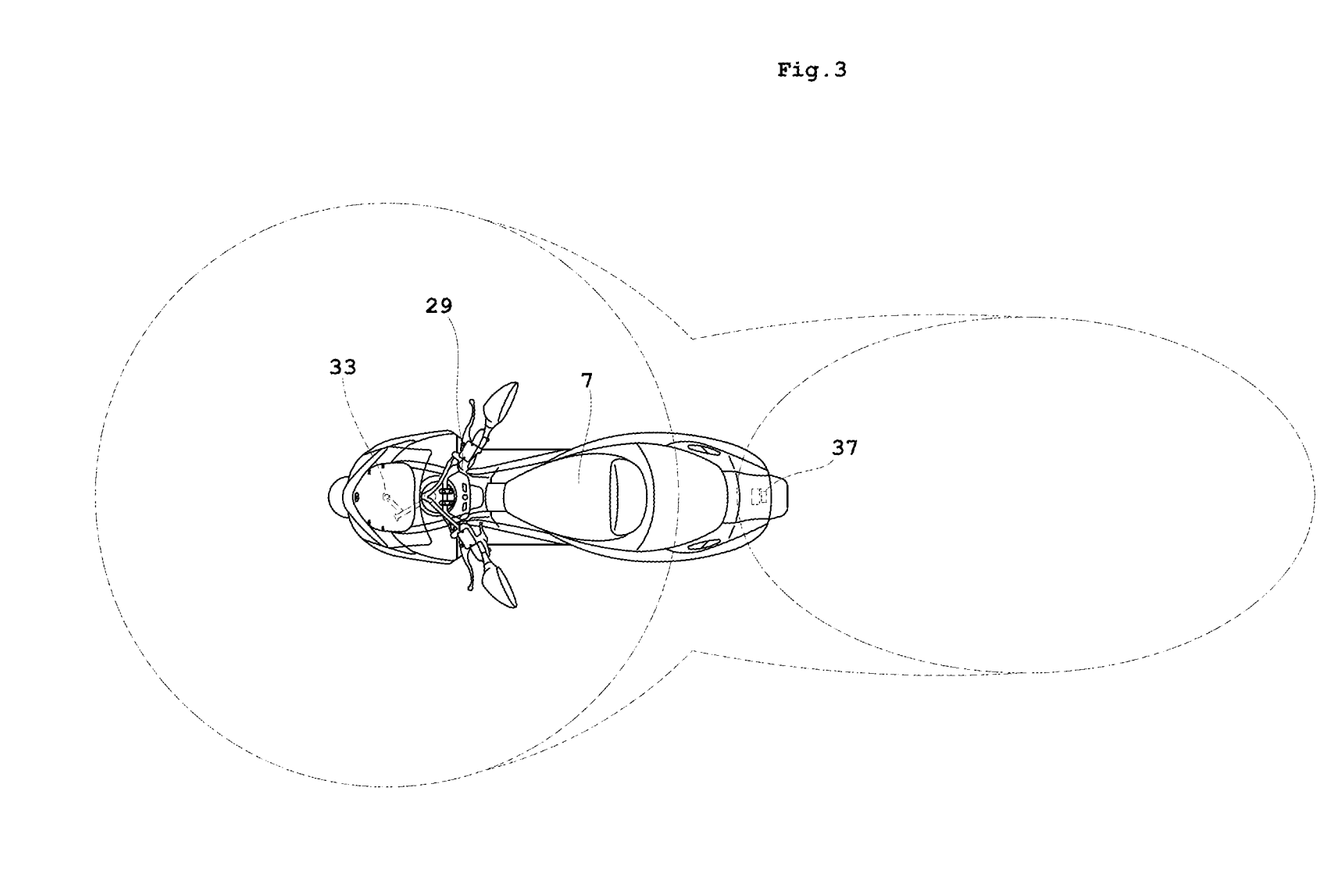
FIG. 3 is a schematic view showing emission patterns of electromagnetic waves in a plan view of the scooter of Embodiment 1.

Embodiment 1 of this invention will be described hereinafter with reference to the drawings.
FIG. 1 is a side view of a scooter according to Embodiment 1. FIG. 2 is a plan view of the scooter according to Embodiment 1. FIG. 3 is a schematic view showing emission patterns of electromagnetic waves in a plan view of the scooter of Embodiment 1.

The scooter which corresponds to the "two-wheeled motor vehicle" in this invention includes a main frame 3 having a head tube 1, a seat frame 5, a seat 7, side covers 9, a grab bar 11, a taillight unit 13, a rear fender 15, a drive train 17, a rear wheel 19, a front fork 21, a front wheel 23, a front cover 25, a headlight 27 and a steering handle 29.

The main frame 3 acts as a framework of the scooter. The seat frame 5 extends rearward from the main frame 3, and supports the seat 7 for seating the rider and a passenger seat 7a for seating a passenger. The taillight unit 13 is attached to the rear of the seat frame 5. The side covers 9 are attached to cover side and rear portions of the seat frame 5, and cover front and lower portions of the taillight unit 13. This taillight unit 13 has a taillight indicating a braking situation and turn signals in an integrated manner. The grab bar 11 is gripped by a passenger or is used when a load is carried.

The drive train 17 is mounted rearward of the main frame 3. The drive train 17 includes an engine, a suspension and so on. The rear wheel 19 is attached rearward of the drive train 17. The rear fender 15 is spaced from the rear wheel 19 to cover an upper portion and an area obliquely upward thereof. The rear fender 15 is formed of resin, for example. A license plate 30 is attached in a tilted posture to the rear of the rear fender 15 and below the taillight unit 13.

The steering handle 29 is tunably attached to an upper portion of the head tube 1. The front fork 21 is attached below the head tube 1, and is interlocked with turning of the steering handle 29. The front wheel 23 is rotatably attached to a lower portion of the front fork 21. The front cover 25 is attached to the front of the head tube 1 through a stay 31 extending from the main frame 3. The headlight 27 is provided on the front cover 25.

A front antenna 33 is mounted in the front cover 25. The front antenna 33 has nondirectional characteristics with an emission pattern and reception sensitivity of electromagnetic waves uniform all around a horizontal plane. This front antenna 33 is erected on an anchor 35 extending toward a front center from the stay 31 serving to attach the front cover 25. The front antenna 33 is located substantially at the middle transversely of the vehicle when seen in plan view, and is located above and rearward of the headlight 27 when seen from a side.

A rear antenna 37 is mounted inward of the side covers 9. The rear antenna 37 has directional characteristics with an emission pattern and reception sensitivity of electromagnetic waves biased to one direction. Specifically, this rear antenna 37 has directionality with the transmit and receive sensitivity directed rearward of the vehicle. The rear antenna 37, which is located inward of the side covers 9, is attached to a lower surface of the taillight unit 13 by an anchor 39. The anchor 39 presents an inverted L-shape when seen from a side, with an upper surface thereof fixed to the lower surface of the taillight unit 13, and the rear antenna 37 is attached to a rear side thereof. The rear antenna 37 is attached to the anchor 39 to assume an upright posture. The rear antenna 37 is located substantially at the middle transversely of the vehicle when seen in plan view, and is located below the taillight unit 13 and above the license plate 30 when seen from a side. Therefore, since no metal parts that would obstruct the emission of electromagnetic waves are arranged rearward of the rear antenna 37, rearwardly directed emission of electromagnetic waves is free from obstruction.

The scooter including the nondirectional front antenna 33 and the rear antenna 37 having rearward directionality as described above forms emission patterns of electromagnetic waves as shown in two-dot chain lines in FIG. 3. When the electromagnetic emission patterns of the front antenna 33 and rear antenna 37 are combined, the resulting shape connects a forward circle and a rearward ellipse shown in the dashed line in FIG. 3.

According to this embodiment, the front antenna 33 mainly performs road-to-vehicle communication with roadside units and vehicle-to-vehicle communication with preceding vehicles and oncoming vehicles at times of passing each other. It is therefore possible to perform communications effectively by employing a nondirectional antenna which has wide-angle transmit-receive characteristics. On the other hand, vehicle-to-vehicle communication with rearward vehicles by means of the rear antenna 37 needs a long communication distance compared with the road-to-vehicle communication and vehicle-to-vehicle communication with oncoming vehicles at times of passing each other. In this invention, the rear antenna 37 has the directionality that enables a long communication distance compared with nondirectionality, and has the directionality rearward of the vehicle. It is therefore possible to also perform communications effectively with rearward vehicles. Since the front antenna 33 is disposed in front of the seat 7 and the rear antenna 37 behind the seat 7, the electromagnetic waves can be inhibited from being attenuated by the bodies of the rider and the passenger. The rear antenna having the rearward directionality can inhibit bad influences of the interference with the electromagnetic waves of the front antenna. As a result, the road-to-vehicle communication and the vehicle-to-vehicle communication with forward vehicles (preceding vehicles and oncoming vehicles) can be performed effectively, and at the same time the vehicle-to-vehicle communication with rearward vehicles can also be performed effectively.

There are the grab bar and a load carrier above the taillight unit 13, and when a load is placed thereon, the rear antenna 37 may be blocked by the load, which may exert a bad influence on the emission of electromagnetic waves. In this embodiment, however, since the rear antenna 37 is located below the taillight unit 13, the rear antenna 37 is not blocked by the load, and no bad influence is exerted on the emission of electromagnetic waves. Therefore, communication is not obstructed by the influence of the load.

By containing the rear antenna 37 inward of the side covers 9 formed of resin, a fine appearance can be maintained without a had influence on the emission of the electromagnetic waves. Since the rear antenna 37 is attached above the license plate 30, the license plate 30 can be prevented from exerting a bad influence on the emission of electromagnetic waves from the rear antenna 37.

The front antenna 33 can be attached relatively easily by attaching the front antenna 33 through the anchor 35 to the stay 31 which fixes the front cover 25.

In the above description, the anchor 39 which fixes the rear antenna 37 is attached to the lower surface of the taillight unit 13. Alternatively, the anchor 39 may be attached to the seat frame 5.

Embodiment 2

Next, Embodiment 2 of this invention will be described with reference to the drawings.

Figure 4:
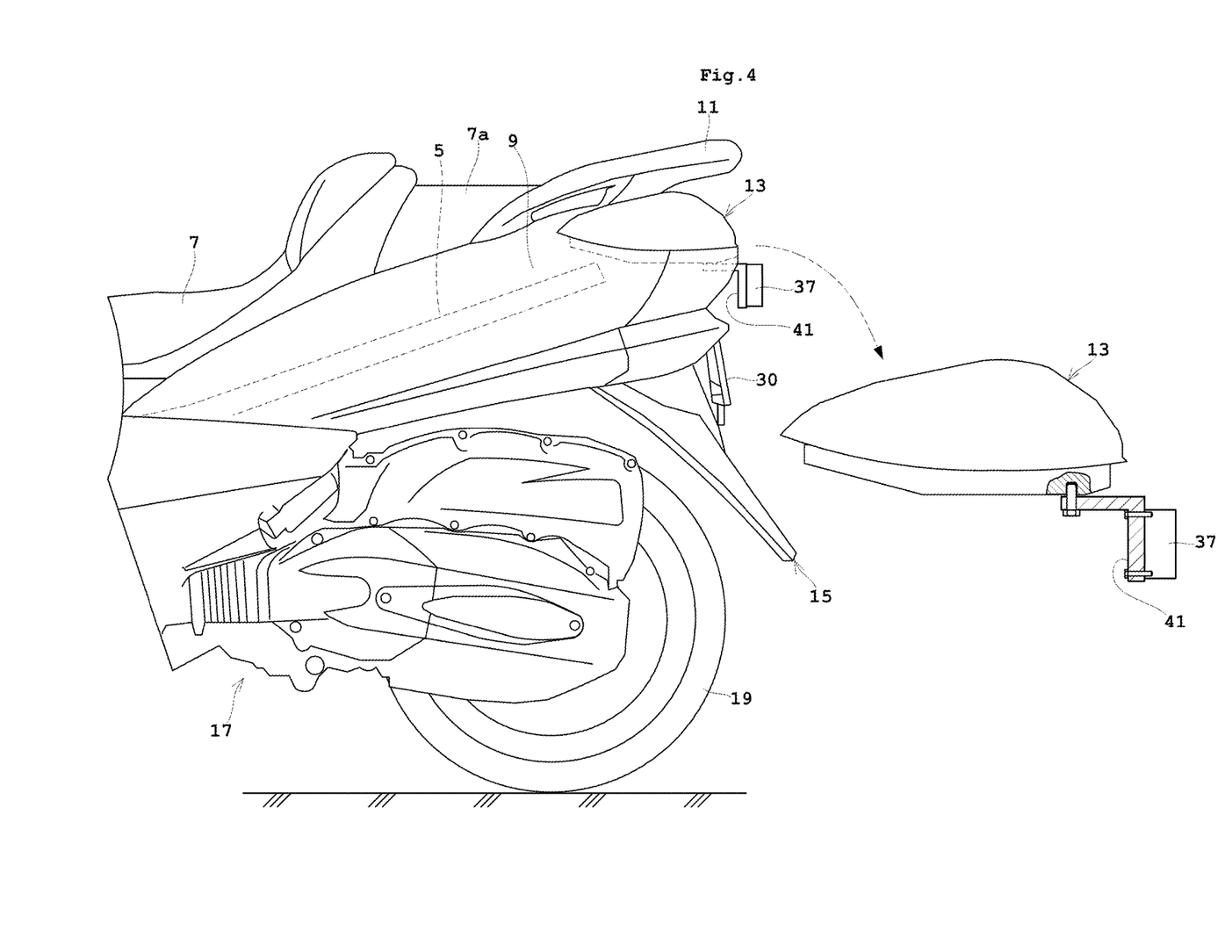
FIG. 4 is an enlarged side view of a portion of a scooter according to Embodiment 2.

FIG. 4 is an enlarged side view of a portion of a scooter according to Embodiment 2.

Components identical to those of foregoing Embodiment 1 are shown with the same signs, and will not particularly be described. This applies to each of the embodiments described subsequently.

The rear antenna 37 is disposed outward of the side covers 9. Specifically, the rear antenna 37 is attached by an anchor 41 having an inverted L-shape. The anchor 41 is fixed at an upper surface thereof to a lower surface of the taillight unit 13, and has the rear antenna 37 attached to a vertical surface thereof. The anchor 41 is attached such that its vertical surface to which the rear antenna 37 is attached protrudes rearward from the taillight unit 13. However, the rear antenna 37 is located above the license plate 30 and below the taillight unit 13 as seen from a side.

According to this embodiment, besides the same effects as those of the foregoing Embodiment 1, the rear antenna 37 can be fixed stably since it is attached through the anchor 41 to the lower surface of the taillight unit 13 located inward of the side covers 9.

The rear antenna 37, since it is disposed outward of the side covers 9, can assure a high degree of freedom of arrangement. Therefore, not only assuring a high degree of freedom of scooter design, this allows the rear antenna 37 to be installed afterward as an add-on.

In the above description, the anchor 41 which fixes the rear antenna 37 is attached to the lower surface of the taillight unit 13. Alternatively, the anchor 41 may be attached to the seat frame 5.

Embodiment 3

Next, Embodiment 3 of this invention will be described with reference to the drawings.

Figure 5:
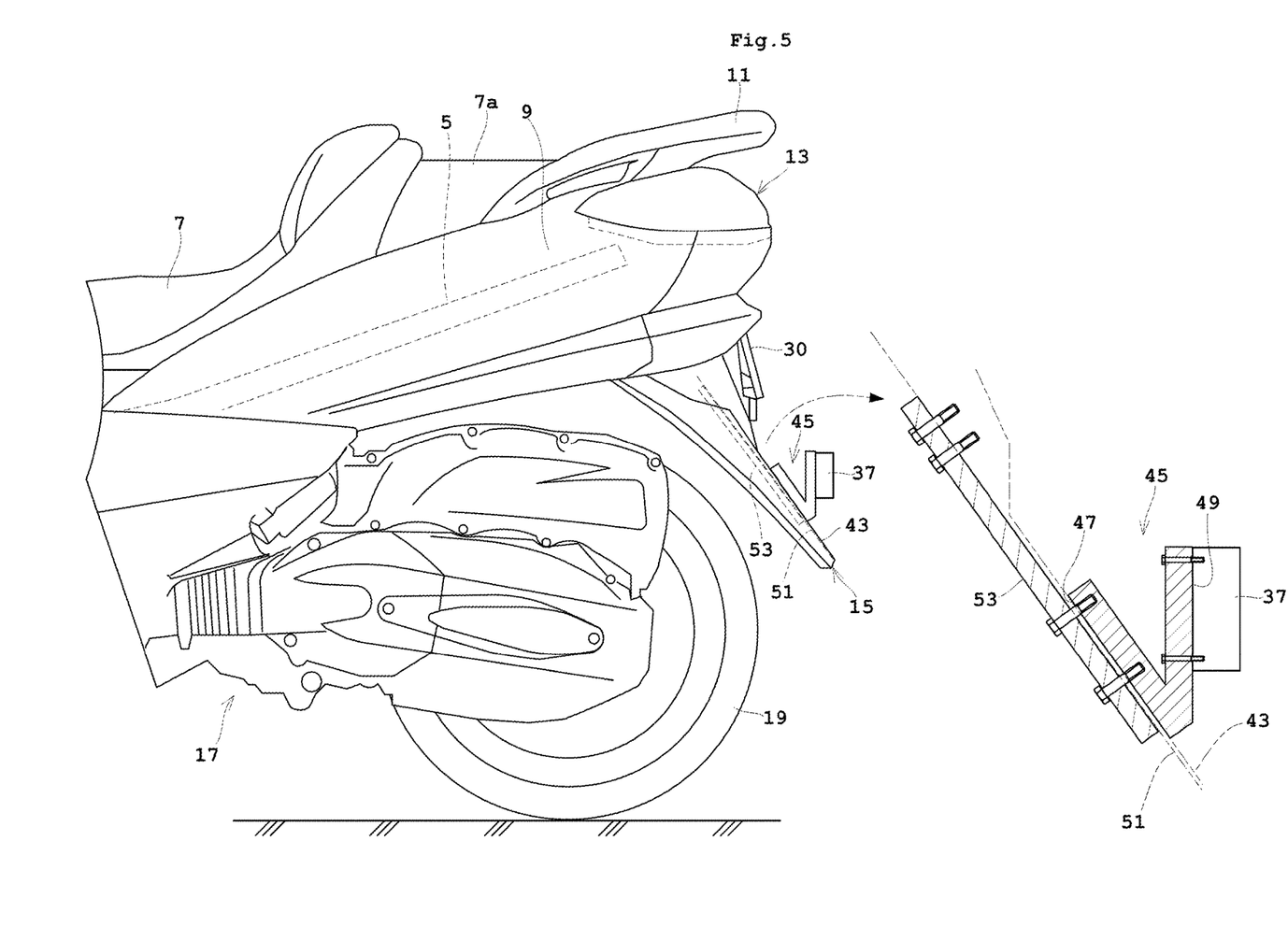
FIG. 5 is an enlarged side view of a portion of a scooter according to Embodiment 3.

FIG. 5 is an enlarged side view of a portion of a scooter according to Embodiment 3.

The rear antenna 37 is attached to a rear slope 43 of the rear fender 15 by an anchor 45. The anchor 45 has a base seating surface 47 attached to the rear slope 43 of the rear fender 15, and an antenna seating surface 49 to which the rear antenna 37 is attached. The anchor 45 is formed such that, as seen from a side, an angle between the base seating surface 47 and antenna seating surface 49 causes the rear antenna 37 attached to the antenna seating surface 49 to be in an upright posture.

A reinforcing member 53 is disposed on a front slope 51 which corresponds to an opposite side of the rear slope 43 of the rear fender 15. The reinforcing member 53 is formed of sheet metal having higher rigidity than the rear fender 15 formed of resin. The rear fender 15 is placed between the reinforcing member 53 and the anchor 45, and the anchor 45 is supported stably. The reinforcing member 53 may have an upper end thereof extending upward to be fastened together with the rear fender 15 to the vehicle body.

According to this embodiment, besides the same effects as those of the foregoing Embodiment 1, while being able to avoid interference with other components, a high degree of freedom can be afforded to an attaching method compared with a case of attachment to other portions. By providing the reinforcing member 53 along the front slope 51, the support for the rear antenna 37 can be strengthened. Further, the angle between the base seating surface 47 and antenna seating surface 49 of the anchor 45 is set to place the rear antenna 37 in an upright posture. The rear antenna 37 can therefore be attached in a posture well suited for vehicle-to-vehicle communication with rearward vehicles.

Embodiment 4

Next, Embodiment 4 of this invention will be described with reference to the drawings.

Figure 6:
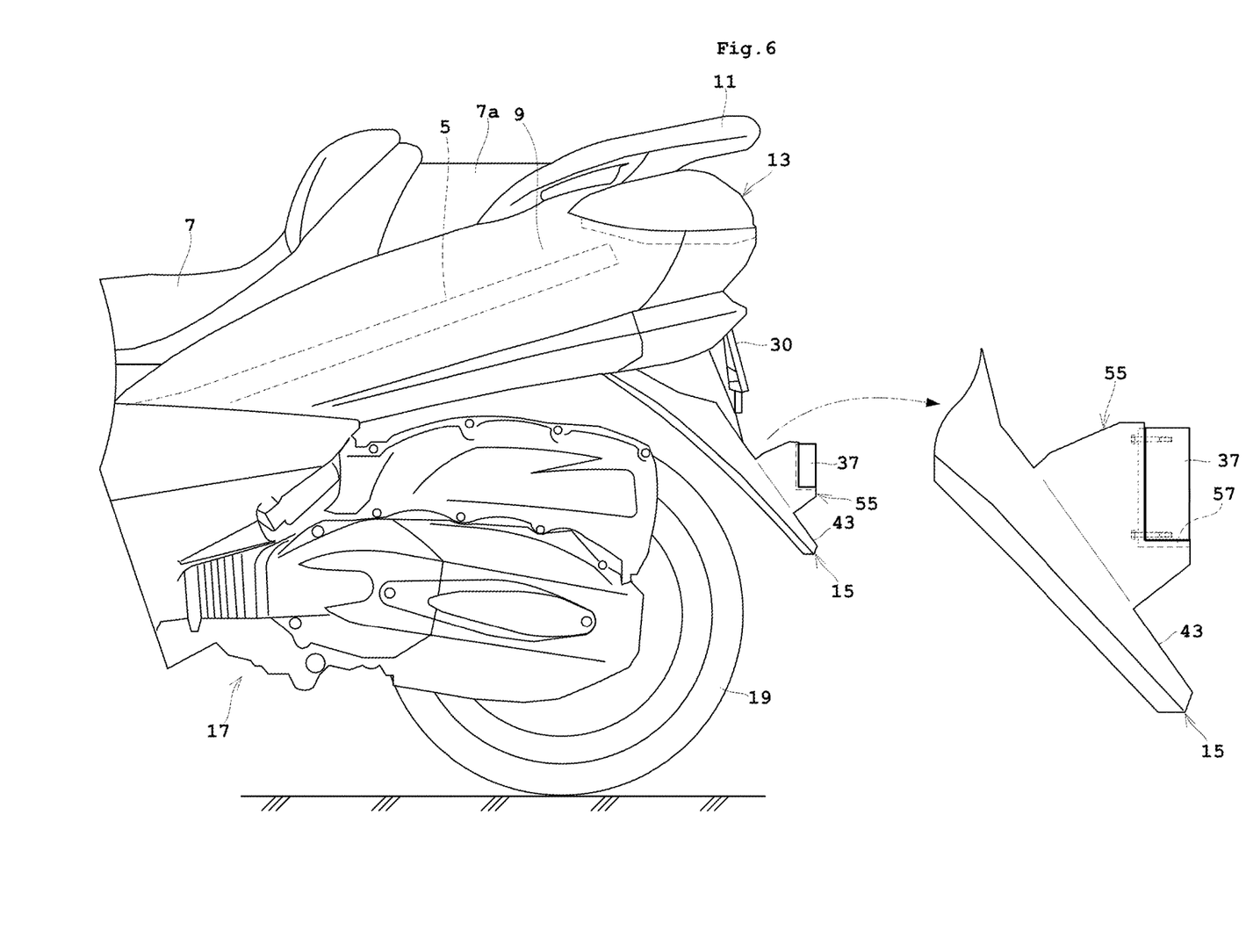
FIG. 6 is an enlarged side view of a portion of a scooter according to Embodiment 4.

FIG. 6 is an enlarged side view of a portion of a scooter according to Embodiment 4.

The rear antenna 37 is attached to the fender 15 as in foregoing Embodiment 3. The rear fender 15 in this embodiment has, formed integrally with the rear slope 43, an attaching portion 55 for attaching the rear antenna 37. This attaching portion 55 has a recess 57 formed for attaching the rear antenna 37. The recess 57 receives a back surface opposite to the electromagnetic waves emitting plane of the rear antenna 37, and a bottom surface of the rear antennas 37, and holds the rear antenna 37 in an upright posture.

According to this embodiment, besides the same effects as those of the foregoing Embodiment 1, since the rear fender 15 and attaching portion 55 are formed integrally, the rear antenna 37 can be attached rigidly to the rear fender 15. Further, the number of parts for attachment can be reduced, thereby to keep the cost low.

Embodiment 5

Next, Embodiment 5 of this invention will be described with reference to the drawings.

Figure 7:
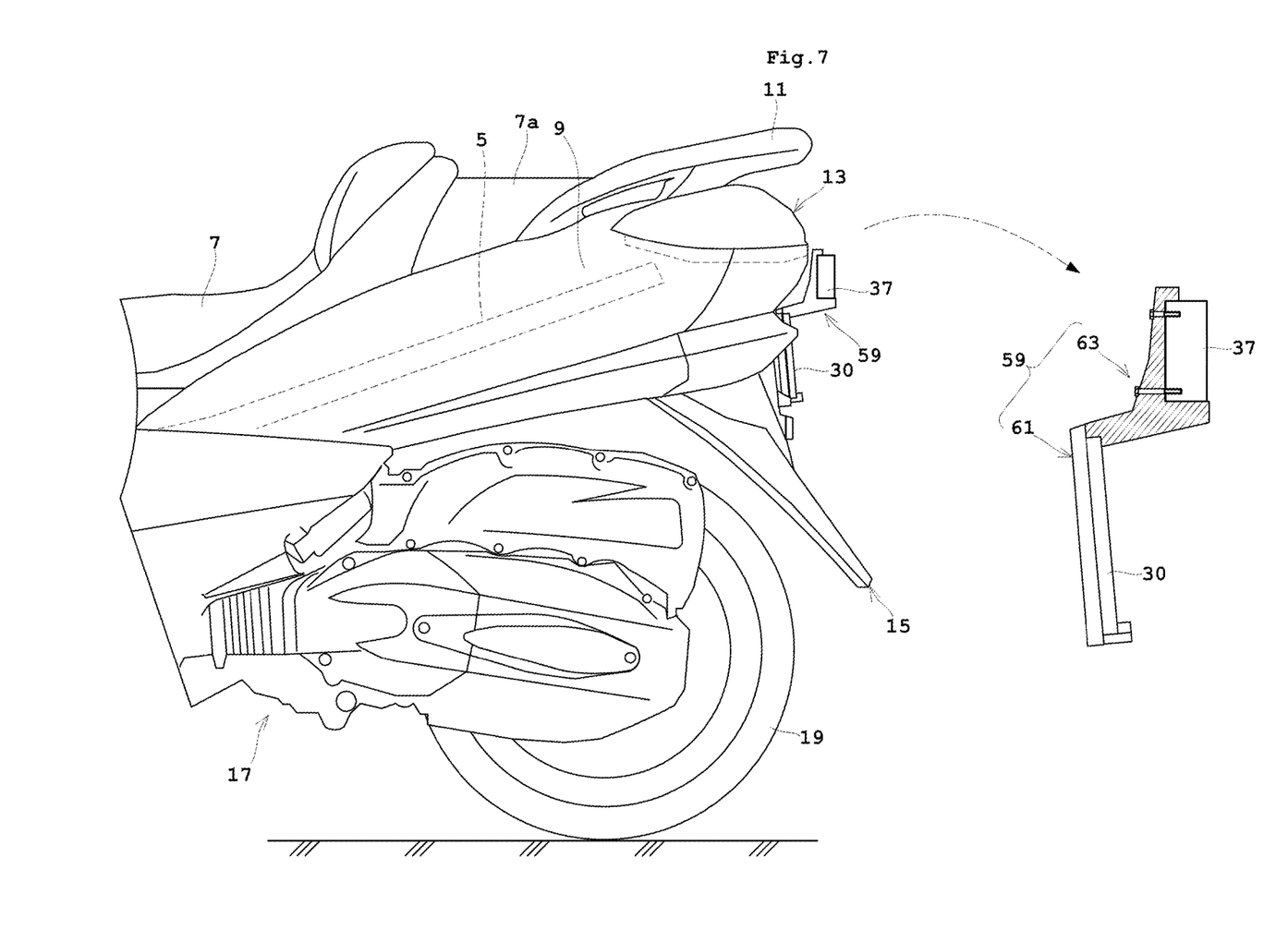
FIG. 7 is an enlarged side view of a portion of a scooter according to Embodiment 5.
Figure 8A:
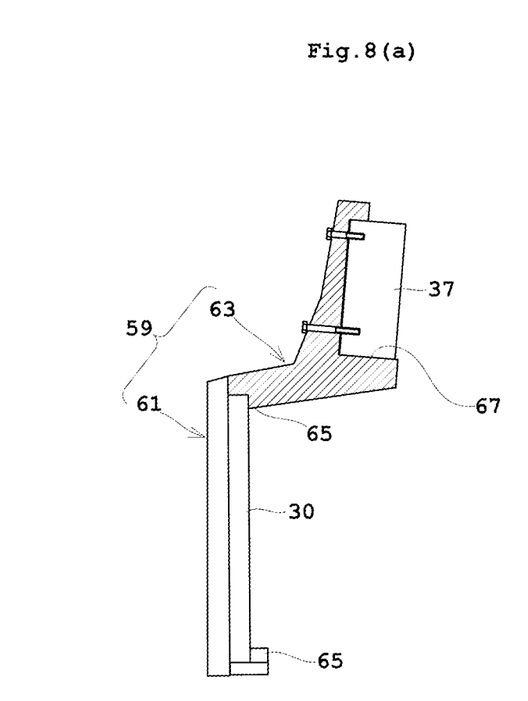
Figure 8B:
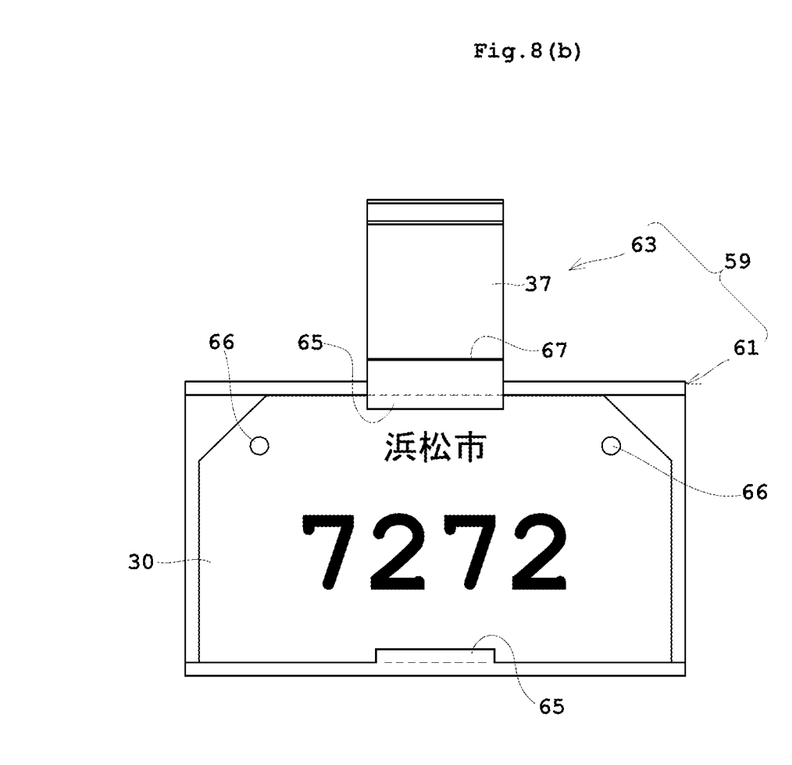

FIG. 7 is an enlarged side view of a portion of a scooter according to Embodiment 5. FIG. 8 shows a license plate mounting bracket, in which (a) is a side view, and (b) is a front view.

The rear antenna 37 is attached to the rear fender 15 through a license plate mounting bracket 59 which is formed of resin. The license plate mounting bracket 59 has a license plate attaching portion 61 and a rear antenna attaching portion 63 integrated together. The license plate attaching portion 61 has supporting projections 65 formed thereon which support an upper part and a lower part of the license plate 30. The license plate 30, in a state of being inserted inward of the upper and lower supporting projections 65 from a side (in a depth direction of the plane of FIG. 8 (a), and a sidewise direction in FIG. 8 (b)), is fixed to the license plate attaching portion 61 with screws 66.

The rear antenna attaching portion 63 is formed to project from an upper middle position of the license plate attaching portion 61, and has a recess 67 formed therein for attaching the rear antenna 37. The rear antenna attaching portion 63 is formed to have an upper part thereof assuming a position tilting slightly downward and rearward of the vehicle (rightward in FIG. 8 (a) and to the near side with respect to the plane of FIG. 8 (b)) when the license plate attaching portion 61 is in an upright posture. With the license plate mounting bracket 59, since the license plate attaching portion 61 is attached in a forwardly tilted posture to the rear fender 15, the rear antenna attaching portion 63 tilting rearward assumes an upright posture.

In this embodiment, the rear antenna 37 can be attached easily since the license plate 30 is attached to the license plate attaching portion 61 of the license plate mounting bracket 59, and the rear antenna 37 is attached to the rear antenna attaching portion 63. The rear antenna 37 can therefore be attached efficiently. An angle between the license plate attaching portion 59 and rear antenna attaching portion 63 of the license plate mounting bracket 59 is set to place the rear antenna 37 in an upright posture. The rear antenna 37 can therefore be attached in a posture well suited for vehicle-to-vehicle communication with rearward vehicles.

Figure 9:
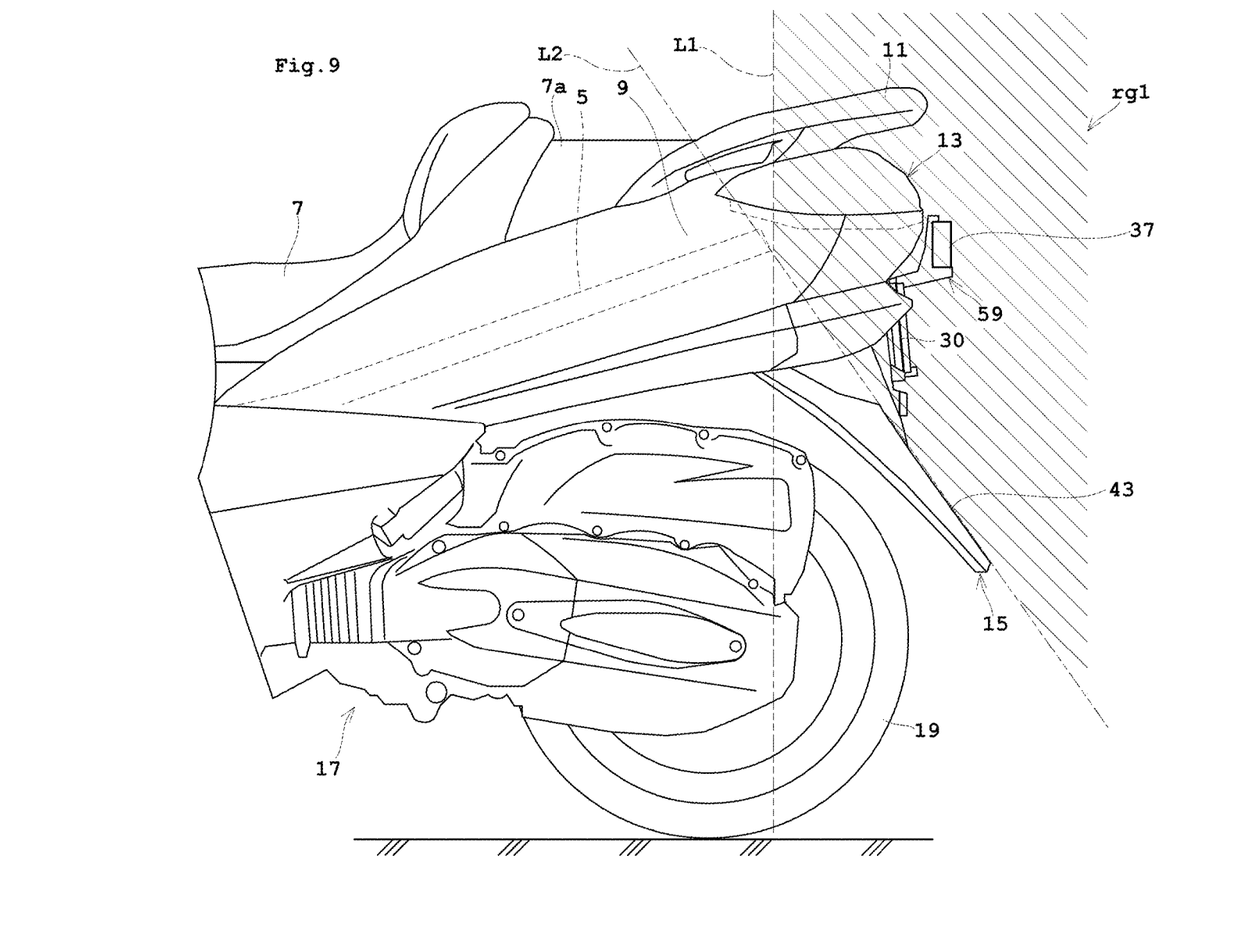
FIG. 9 is a view illustrating a preferred region for attaching a rear antenna.

A mounting position of the rear antenna 37 in each of Embodiments 1-5 described hereinbefore is, preferably, in a region rg1 (the hatched region) shown in FIG. 9. Specifically, it is preferable to position the rear antenna 37 in a rearward region rg1 marked by a vertical line L1 drawn from the rear end of the seat frame 5 and an extended line L2 along the rear slope 43 of the rear fender 15. What is still more desirable is a part of region rg1 below the taillight unit 13.

With the rear antenna 37 positioned in the region rg1, stable communication can be performed since bad influences of the other components can be prevented while preventing the bad influence of a load placed on the grab bar 11.

Embodiment 6

Next, Embodiment 6 of this invention will be described with reference to the drawings.

Figure 10:
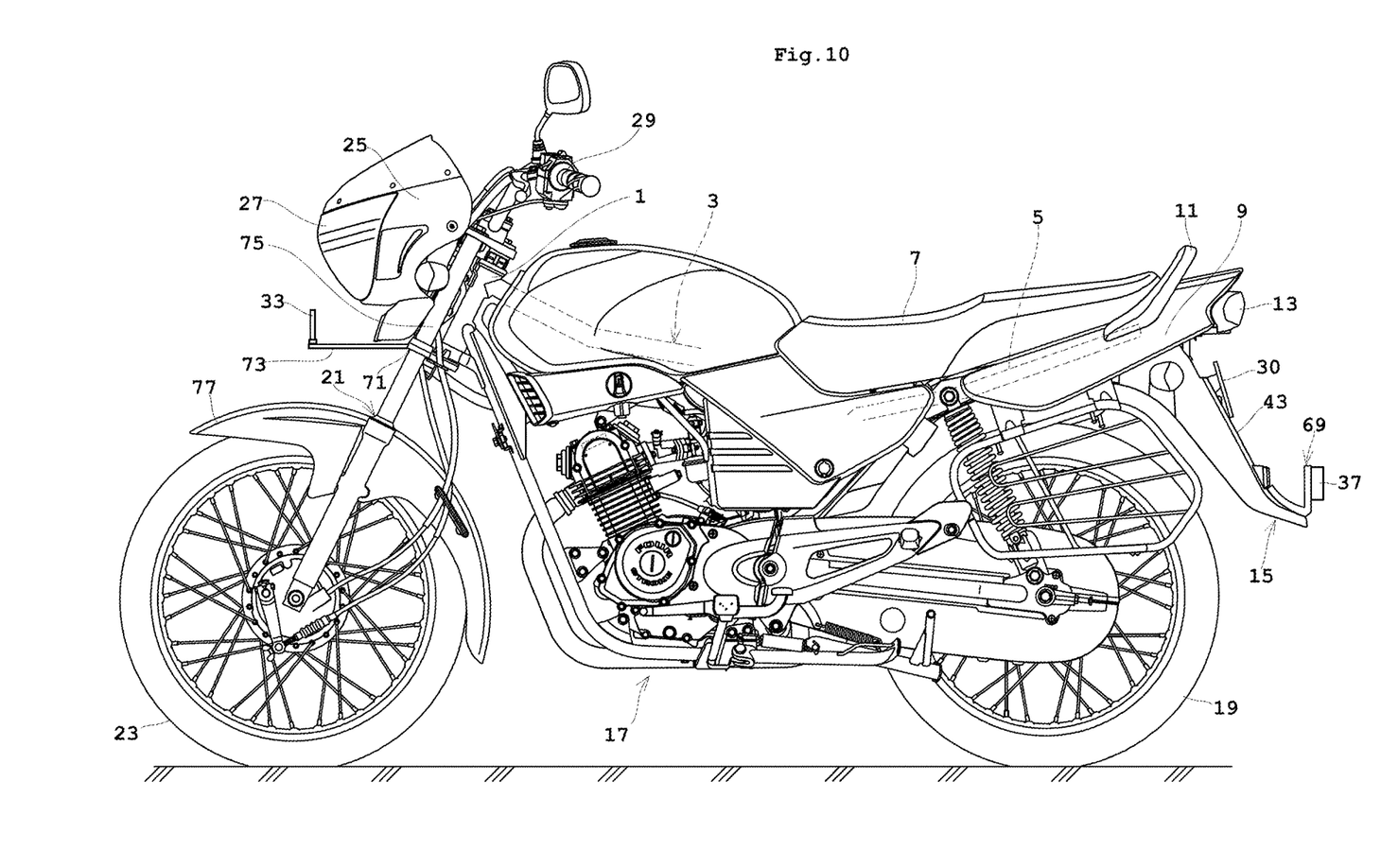
FIG. 10 is a side view of a two-wheeled motor vehicle according to Embodiment 6.

FIG. 10 is a side view of a two-wheeled motor vehicle according to Embodiment 6.

Foregoing Embodiments 1-5 have been described taking a scooter as an example of two-wheeled motor vehicles, but this embodiment will be described taking what is called a naked type two-wheeled motor vehicle as the example of the two-wheeled motor vehicles. The naked type refers to a two-wheeled motor vehicle with an uncovered engine and frame.

This naked type two-wheeled motor vehicle has an attachment form similar to foregoing Embodiment 3. Specifically, a directional rear antenna 37 is attached to a lower portion of a rear slope 43 of a rear fender 15 through an anchor 69. The anchor 69 is formed to have such a shape that the antenna 37 assumes an upright posture when attached to the rear fender 15.

A nondirectional front antenna 33 is erected at the other end of an anchor 73 having one end thereof attached to a lower bracket 71 of a front fork 21. The anchor 73 places the front antenna 33 in front of and below a headlight 27. With the front antenna 33 attached to the lower bracket 71 through the anchor 73 in this way, the front antenna 33 can be attached easily as in Embodiment 1, even if this is the naked type motor vehicle without the front cover 25. Lighting by the headlight 27 is not obstructed, and in addition, forward emission of the electromagnetic waves from the front antenna 33 is not obstructed by the headlight 27.

Also the case of the front antenna 33 and rear antenna 37 being attached as described above can obtain emission patterns of electromagnetic waves similar to those in foregoing Embodiment 1 (FIG. 3). Therefore, effects similar to those in foregoing Embodiment 1 are produced.

Also with the naked type two-wheeled motor vehicle, the rear antenna 37 may be attached in the modes of foregoing Embodiments 3, 4 and 5. As in foregoing Embodiment 2, the rear antenna 37 may be disposed outward of the side covers 9.

Figure 11:
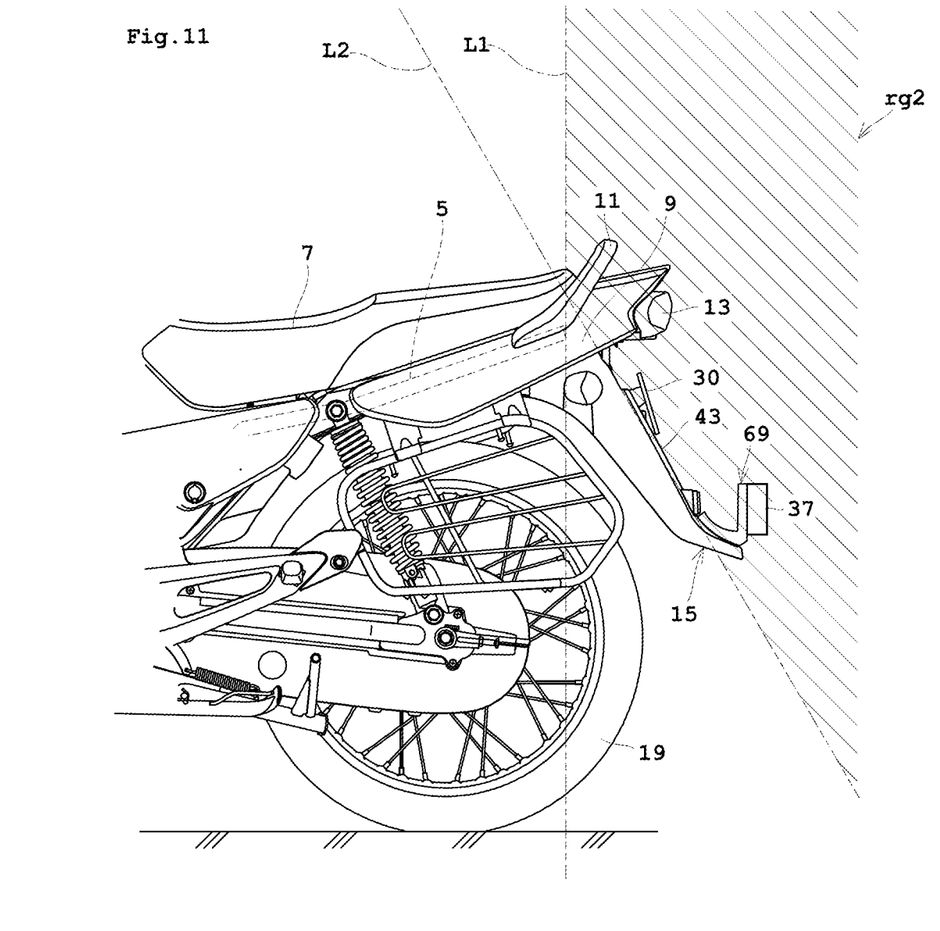
FIG. 11 is a view illustrating a preferred region for attaching a rear antenna.

A mounting position of the rear antenna 37 in Embodiment 6 described above, preferably, is in a region rg2 (the hatched region) shown in FIG. 11. That is, a preferred mounting position of the rear antenna 37 is in a rearward region rg2 marked by a vertical line L1 drawn from the rear end of the seat frame 5 and an extended line L2 along the rear slope 43 of the rear fender 15. What is still more desirable is a part of region rg2 below the taillight unit 13. The rear antenna 37 is therefore not limited to the above-described mounting position in FIG. 10, but may be disposed in any appropriate position within the region rg2.

Although the front antenna 33 is attached to the lower bracket 71 through the anchor 73 in foregoing Embodiment 6, the anchor 73 may be attached to an upper portion of an inner tube 75 (upper tube) of the front fork 21, for example.

This invention is not limited to the foregoing embodiments, but may be modified as follows:

(1) In Embodiments 1-6 described above, two-wheeled motor vehicles are exemplified by the scooter type and the naked type. However, this invention is not limited to these types of two-wheeled motor vehicles, but is applicable also to other types of two-wheeled motor vehicles.

(2) In Embodiments 1-6 described above, the front antenna 33 and rear antenna 37 are attached using various types of anchors and mounting brackets. This invention does not provide these anchors or mounting brackets as indispensable. What is necessary is to provide the nondirectional front antenna 33 in a position forward of the seat 7, and the directional rear antenna 37 in a position rearward of the seat 7.

(3) In Embodiments 1-6 described above, the front antenna 33 and the rear antenna 37 are arranged in substantially middle positions transversely of the vehicle. However, this invention may have the front antenna 33 and rear antenna 37 in positions shifted right or left from the middle transversely of the vehicle. For example, the front antenna 33 may be attached to a side surface of the front cover 25, and the rear antenna 37 may be attached to a side surface of a side cover 9.

REFERENCE SIGNS LIST

1 . . . head tube
3 . . . main frame
5 . . . seat frame
7 . . . seat
9 . . . side covers
13 . . . taillight unit
15 . . . rear fender
21 . . . front fork
25 . . . front cover
27 . . . headlight
30 . . . license plate
33 . . . front antenna
35 . . . anchor
37 . . . rear antenna
39 . . . anchor

The invention claimed is:

1. A two-wheeled motor vehicle configured to communicate with both forward and rearward vehicles, the two-wheeled motor vehicle comprising:
   a seat configured to accommodate a rider of the two-wheeled motor vehicle at a time of riding the two-wheeled motor vehicle;
   a front antenna disposed in front of the seat with respect to a riding direction of the two-wheeled motor vehicle, the front antenna being a non-directional antenna; and
   a rear antenna disposed behind the seat with respect to the riding direction of the two-wheeled motor vehicle, the rear antenna being a directional antenna, a direction of which being opposite to the riding direction of the two-wheeled motor vehicle.

2. The two-wheeled motor vehicle according to claim 1, further comprising:
   a taillight unit disposed at a rear end of the two-wheeled motor vehicle,
   wherein the rear antenna is attached to the two-wheeled motor vehicle to be lower than the taillight unit.

3. The two-wheeled motor vehicle according to claim 2, further comprising:
   a side cover covering areas around a lower part of the taillight unit,
   wherein the rear antenna is disposed within the side cover.

4. The two-wheeled motor vehicle according to claim 3, wherein the rear antenna is attached through an anchor to a lower surface of the taillight unit located within the side cover.

5. The two-wheeled motor vehicle according to claim 2, further comprising:
   a side cover covering areas around a lower part of the taillight unit,
   wherein the rear antenna is disposed outside of the side cover.

6. The two-wheeled motor vehicle according to claim 5, further comprising:
   a rear fender having a rear slope,
   wherein the rear antenna is attached to the rear slope of the rear fender through an anchor.

7. The two-wheeled motor vehicle according to claim 6, wherein
   the rear fender has a front slope opposite to the rear slope, and a reinforcing member attached along the front slope for supporting the rear antenna.

8. The two-wheeled motor vehicle according to claim 6, wherein
   the anchor has a base seating surface to which the rear slope of the rear fender is attachable, and an antenna attaching surface to which the rear antenna is attachable, the base seating surface and the antenna attaching surface having an angle formed therebetween to thereby cause the rear antenna to be in an upright posture as seen from a side of the two-wheeled motor vehicle.

9. The two-wheeled motor vehicle according to claim 6, wherein:
   the rear fender has, formed integrally with the rear slope, an attaching portion for attaching the rear antenna; and
   the rear antenna is attachable to the attaching portion.

10. The two-wheeled motor vehicle according to claim 1, wherein the rear antenna is attachable to the two-wheeled motor vehicle to be higher than a license plate thereof.

11. The two-wheeled motor vehicle according to claim 10, further comprising a license plate mounting bracket having, integrated thereto,
    a license plate attaching portion to which the license plate is attachable, and
    a rear antenna attaching portion to which the rear antenna is attachable.

12. The two-wheeled motor vehicle according to claim 11, wherein the license plate mounting bracket is so formed that an angle between the license plate attaching portion and the rear antenna attaching portion causes the rear antenna to be in an upright posture as seen from a side of the two-wheeled motor vehicle.

13. The two-wheeled motor vehicle according to claim 2, further comprising:
    a main frame;
    a seat frame that is continuous with and rearward of the main frame; and
    a rear fender having a rear slope,
    wherein the rear antenna is attached to the two-wheeled motor vehicle in a rearward region, which is a region behind a first plane that is perpendicular to the ground and in which a rear end of the seat frame is located, and above a second plane in which the rear slope of the rear fender is located.

14. The two-wheeled motor vehicle according to claim 1, further comprising:
    a main frame;
    a head tube for fixing a front cover; and
    a stay extending from the main frame, the stay being formed in front of the head tube,
    wherein the front antenna is attached through an anchor to the stay.

15. The two-wheeled motor vehicle according to claim 1, further comprising:
    a front fork,
    wherein the front antenna is attached to the front fork through an anchor.

16. The two-wheeled motor vehicle according to claim 15, further comprising:

a headlight unit disposed at a front end of the two-wheeled motor vehicle, wherein the front antenna is attached to the two-wheeled motor vehicle in front of the headlight and below the headlight.

17. An antenna system for a two-wheeled motor vehicle to perform communication, the antenna system comprising:
a non-directional antenna disposed at a front end of the motor vehicle; and
a directional antenna disposed at a rear end of the motor vehicle, a direction of the directional antenna being opposite to a riding direction of the motor vehicle.

* * * * *